United States Patent
McCormack

(10) Patent No.: US 9,390,287 B2
(45) Date of Patent: Jul. 12, 2016

(54) SECURE DATA SCANNING METHOD AND SYSTEM

(71) Applicant: International Business Machines Corporation, Armonk, NY (US)

(72) Inventor: Robert John McCormack, Southport (AU)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 14/041,068

(22) Filed: Sep. 30, 2013

(65) Prior Publication Data

US 2014/0032930 A1 Jan. 30, 2014

Related U.S. Application Data

(63) Continuation of application No. 12/731,262, filed on Mar. 25, 2010, now Pat. No. 8,549,322.

(51) Int. Cl.
| G06F 21/64 | (2013.01) |
| G06F 21/55 | (2013.01) |
| G06F 21/56 | (2013.01) |

(52) U.S. Cl.
CPC ............... *G06F 21/64* (2013.01); *G06F 21/55* (2013.01); *G06F 21/56* (2013.01); *G06F 2221/2101* (2013.01)

(58) Field of Classification Search
CPC ..... G06F 21/64; G96F 21/6218; G96F 21/55; G96F 21/56
USPC .................... 713/189, 194; 726/26
See application file for complete search history.

(56) References Cited

U.S. PATENT DOCUMENTS

| 6,502,135 | B1* | 12/2002 | Munger et al. ................. 709/225 |
| 6,785,810 | B1 | 8/2004 | Lirov et al. |
| 7,228,416 | B2 | 6/2007 | Nishizawa et al. |
| 7,444,331 | B1 | 10/2008 | Nachenberg et al. |
| 7,558,796 | B1 | 7/2009 | Bromwich et al. |
| 7,558,970 | B2 | 7/2009 | Bellovin et al. |
| 7,743,069 | B2* | 6/2010 | Chitkara et al. .............. 707/781 |
| 7,809,135 | B2* | 10/2010 | Johnson et al. ................. 380/44 |
| 8,375,224 | B2* | 2/2013 | Youn et al. ..................... 713/193 |
| 2002/0038421 | A1* | 3/2002 | Hamada ........................ 713/171 |
| 2006/0107070 | A1* | 5/2006 | Rice et al. ..................... 713/190 |
| 2008/0021936 | A1 | 1/2008 | Reynolds |
| 2008/0216174 | A1* | 9/2008 | Vogel et al. ..................... 726/22 |

(Continued)

OTHER PUBLICATIONS

Boneh et al, "Public Key Encryption with Keyword Search," Lecture Notes in Computer Science, pp. 506-522, 2004.

(Continued)

*Primary Examiner* — Tae Kim
*Assistant Examiner* — Shu Chun Gao
(74) *Attorney, Agent, or Firm* — Richard Wilhelm; David H. Judson

(57) ABSTRACT

A method of scanning secure data in a data store is performed in a manner that does not expose the scan data, the files being searched, or information about when matches occur between the scan data and the files. During the scan process, encrypted versions of searched files are compared to encrypted versions of match strings, and any resulting match data is encrypted before being written into a results file. In addition, to disguise when match entries are written, during the scan one or more encrypted dummy items are written into the results file.

12 Claims, 6 Drawing Sheets

(56) References Cited

U.S. PATENT DOCUMENTS

2009/0010436 A1 1/2009 Fuhr et al.
2011/0004607 A1* 1/2011 Lokam et al. ................ 707/759

OTHER PUBLICATIONS

Bennett et al., "Efficient Sharing of Encrypted Data," Lecture Notes in Computer Science, pp. 107-120, 2002.
Xie et al, "Protecting Privacy in Key-Value Search Systems," 22nd Annual Security Applications Conference (ACSAC '06), 2006.
Chang et al, "Privacy Preserving Keyword Searches on Remote Encrypted Data," Lecture Notes in Computer Science, Applied Cryptography and Network Security, 2005.
Bauer, Mick, "syslog Configuration", Linux Journal, No. 92, Dec. 2001.
PCT/EP2011/054389, Search Report, Jul. 1, 2011.

* cited by examiner

SECURE DATA SCANNING METHOD AND SYSTEM

BACKGROUND OF THE INVENTION

1. Technical Field

This disclosure relates generally to secure data scanning in a data processing system.

2. Background of the Related Art

Enterprises often desire to store data securely. Information technology (IT) administrators can then run tests on these data storage systems to detect the continued integrity of the secure data. Data scanning tools for this purpose are well-known in the prior art. These tools are configured to search for data strings located within files or data objects and to return scan results. These tests are designed to identify whether the secure data is in the location at which it was originally stored or whether it might have been moved (either inadvertently or maliciously) to other locations. When scanning for the presence of the secure data, known scanning and reporting techniques tend to expose the secure data to potential additional scrutiny in a manner that is undesirable. In particular, these techniques may expose both the secure data itself, as well as the location of that secure data within the enterprise's data storage system.

BRIEF SUMMARY

A method of scanning secure data in a data store is performed in a manner that does not expose the scan data, the files being searched, or information about when matches occur between the scan data and the files. In one embodiment, and for each of a set of secure files, the method begins by encrypting into a data string a sample of the secure file and associated metadata. The resulting data strings are then stored in a container file. A scan of the secure data is then initiated by identifying a list of files to be searched. For each file on the list of files, an encrypted version of the file is then compared against the data strings in the container file. If the encrypted version of the file matches any data strings in the container file, information about the match is encrypted and written into a results file. As the scan iterates through the files on the list of files, an encrypted version of at least one dummy match item is inserted into the results file to disguise when matches have occurred. Upon completion of the scan, an encrypted version of the list of files also is written to the results file. The results file, which does not expose any details about the scan data or the matches, can then be used to output an indication identifying where each match occurred during the scan.

According to another embodiment, an article comprising a tangible machine readable medium is provided and stores a program. The program is executed by a machine to perform a method of scanning secure data. According to the method, and for each file of a list of files, the program compares for a match an encrypted version of the file against a set of data strings, each of the data strings having been generated by applying a key to a sample of a secure file and associated metadata. Upon determining a match, the program encrypts information about the match and saves it to a results file. During this process, the program also inserts at random intervals into the results file an encrypted version of a dummy data item to disguise when matches have occurred.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
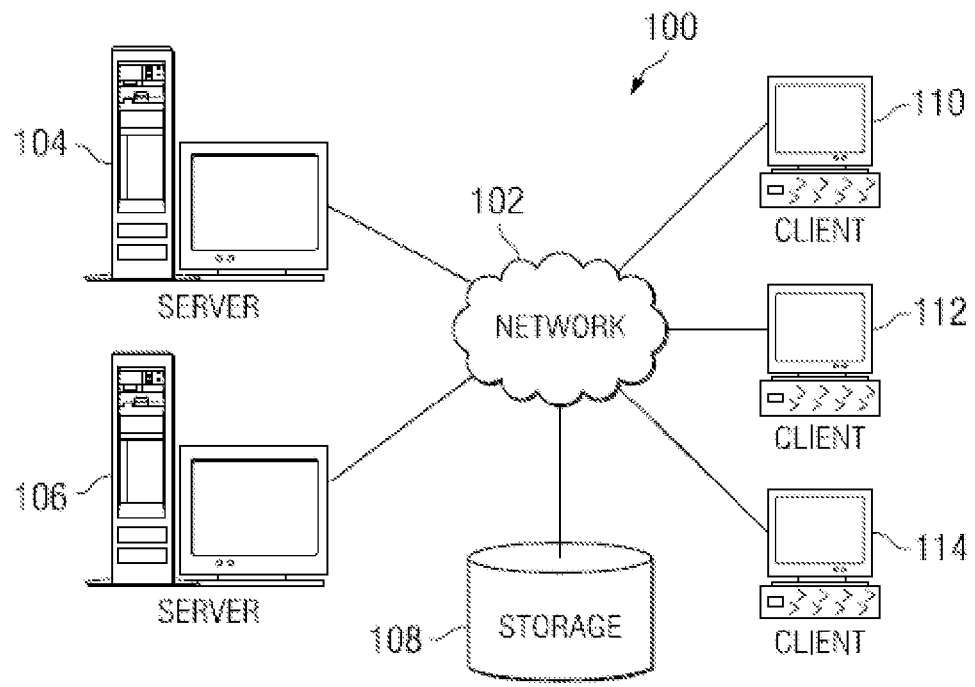
FIG. 1 depicts an exemplary block diagram of a distributed data processing environment in which exemplary aspects of the illustrative embodiments may be implemented.
Figure 2:
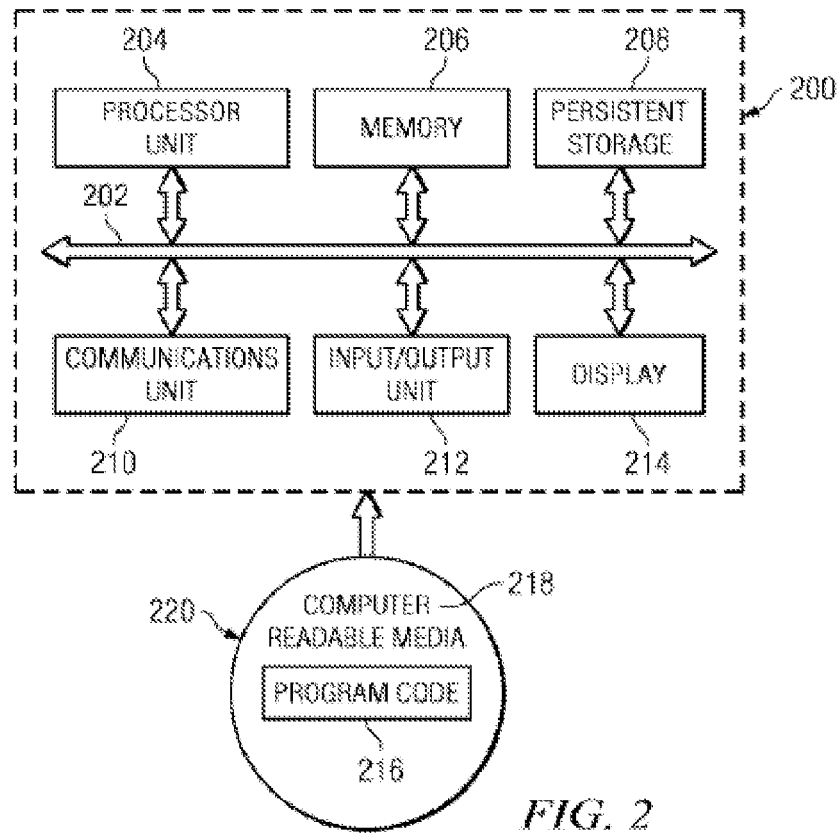
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP)

suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

Figure 3:
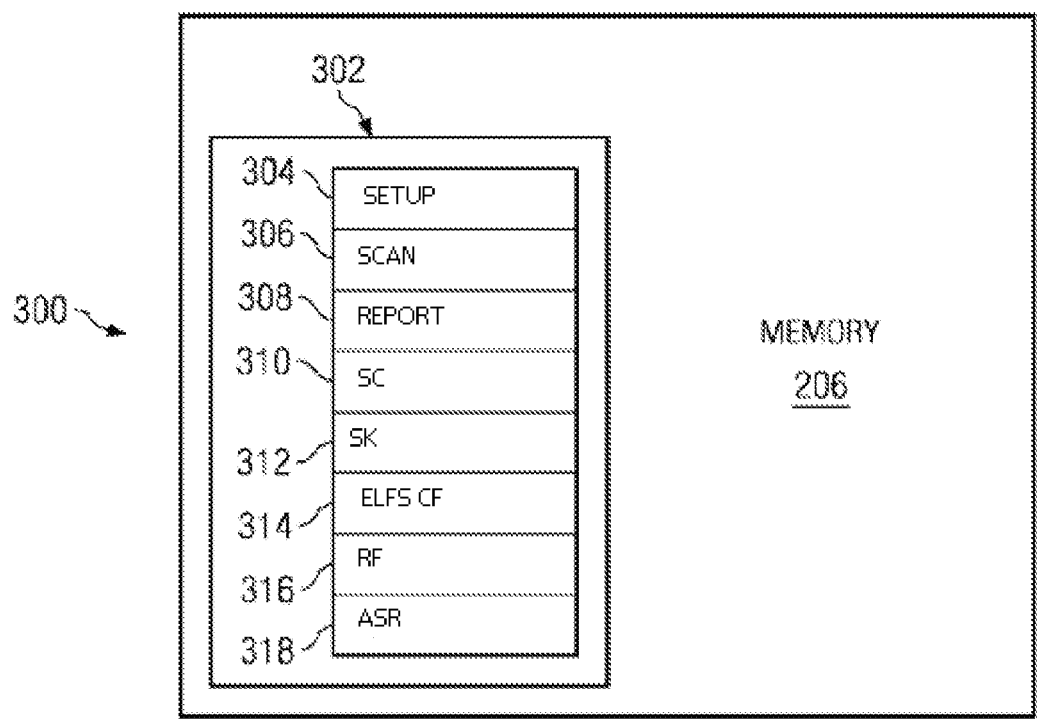
FIG. 3 is a block diagram of high level components of privacy-protected data scanning mechanism in which the disclosed subject matter may be implemented.

FIG. 3 illustrates the high level components and associated data structures of a secure data scanning mechanism 300 according to the teachings in this disclosure. An instance of this mechanism 302 is shown as executing within memory 206 of data processing system 200 of FIG. 2. As will be described in more detail below, the mechanism 302 comprises a set of routines, and associated data structures. The routines include a setup routine 304, a scanning routine 306, and a report routine 308. The setup routine 304 is used to identify which of a set of secure files in a data store (or system) will be scanned. The scanning routine 306 performs the actual scanning of the identified files, and the report routine 308 generates an output describing the scan results. As will be seen, these routines create and/or use various data structures including, without limitation, a scan certificate 310, which is digital certificate that stores or identifies a scan key (SK) 312. The scan key is used to secure various data throughout the process. A file called ELFS CF 314 stores a list of data strings encrypted by the SK and that will be the subject of a scan by the scanning routine. A results file RF 316 includes the scan results for each pass of the scanning process through a set of secure files being searched. An audit scan report (ASR) 318 provides details regarding the results of the scan. The data structures (as well as others that are used during the process) may exist in memory 206 persistently or transiently, depending on their function. Although the routines 304, 306 and 308 are shown as distinct, this is not a limitation, as these functions (or portions thereof) may be combined.

In general, the scanning mechanism operates in conjunction with data that has been stored securely in a data store (or, more generally, a data processing system). This is any data (e.g., a file in a file system, an object in a database, or the like), that an entity desires to remain protected from unauthorized access. The scanning mechanism 300 of this disclosure provides a tool or utility by which the entity can run tests on such data (or any portions thereof) to ensure that it remains protected. The data "under test" may be located within a particular data store, or it may be distributed across many data stores or processing systems. As will be seen, the tool operates in a manner that preserves the security of the data, as well as the identity of that data (i.e. what data the entity deems to be secure). Thus, an unauthorized observation of the scan itself does not reveal any information about the data under scan or the actual results of the scan (i.e., which data matched, and which did not).

The process flow diagrams in FIGS. 4-7 illustrate an embodiment of the secure data scanning method implemented by the mechanism 300. For illustrative purposes, the scanning method is described in the context of a generic "data store" as the target of the scan, with the data store storing secure data, although this is not a limitation, as the scan technique described herein may be used in other contexts, such as with respect to data in transit.

The inventive method is now described.

Figure 4:
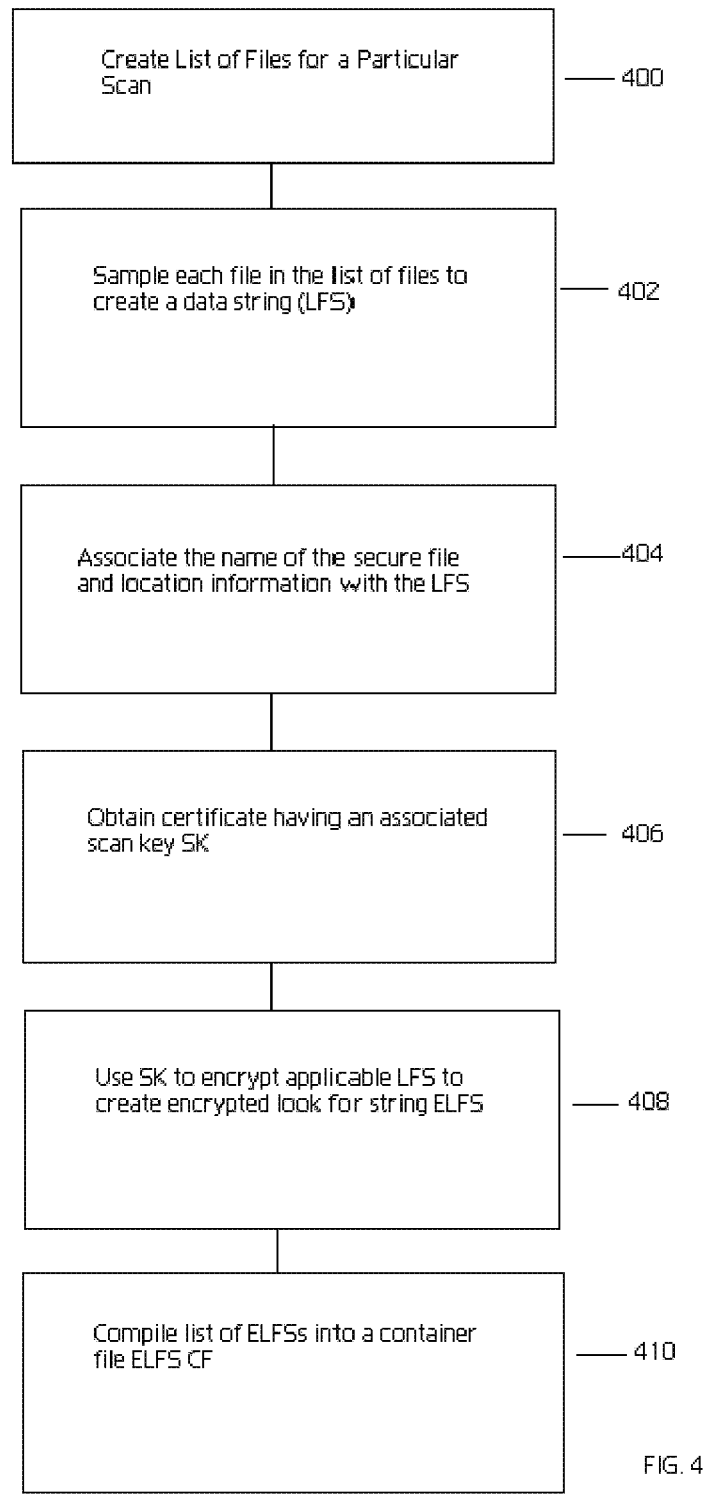
FIG. 4 is a process flow diagram illustrating a setup routine of the scanning mechanism.

A scan method according to the invention begins with a setup phase using the setup routine 302 (of FIG. 3), and this phase which is illustrated in the process flow diagram of FIG. 4. Typically, this phase is undertaken by an administrator or other person or entity (which may be a program entity) having authorized access to the mechanism. In a typical use scenario, at step 400, the administrator creates a specific "list of files" from within a target computer system. This is a list of files that will be the subject of a particular scan, and the list may comprise any number of one or more files. Typically, each file contains information that is desired to be protected from unauthorized access, although it is not required that all of the information in a given file satisfies this criterion. Each file in this list is called a "secure file" (SF). In the setup phase, at step 402, each file in the list of files is sampled to create a data string for each SF in the list. Preferably, the data string is of a size sufficient to identify the associated SF (or portions thereof). The sampling process may be quite varied. It may be a simple process of taking a portion of the file that is capable of representing a security breach if that portion were found in another file or in a location where it may not be protected by available access control measures. As used here, such occurrences sometimes may be referred to as "anomaly." Other sampling methods may be used to create the data string associated with the SF including, without limitation, the use of statistical sampling from within the contents of the secure file. As non-limiting examples, another sampling method creates a data string comprising random segments of data from the secure file, or comprising segments of data from the secure file to which a given function has been applied. Conveniently, the data string (or "string of data") may be referred to a "look for string (LFS)" as it represents data that will be examined during the data scan, as will be seen. Preferably, at step 404, each LFS has associated therewith (e.g., appended thereto) the name of the secure file, together with its location information, namely, its location within the data store. Preferably, this appended information (sometimes referred to as "metadata") is not used for matching purposes, as described below. As part of the setup phase, preferably a certificate is created or obtained and stored within a secure location. This is step 406. Preferably, this certificate (sometimes referred to as a scan certificate or "SC") is a digital certificate compliant with the X.509 standard, and it contains a key used for encryption and/or decryption. In an illustrative embodiment, the key is a "symmetric" key in that the same key may be used for both encryption and decryption. In an alternative embodiment, the key is a public key of a public key pair used in a public key cryptosystem (e.g. PGP). In either case, the key is sometimes referred to herein as a scan key (SK). At step 408, the administrator runs a utility to use SK to encrypt each LFS. The utility may be part of the setup routine. An encrypted LFS is referred to herein as an "encrypted look for string" (ELFS). At step 410, the routine then stores the list of ELFSs into a file. This file is the ELFS container file (ELFS CF) 314 described above. This completes the setup phase.

Figure 5:
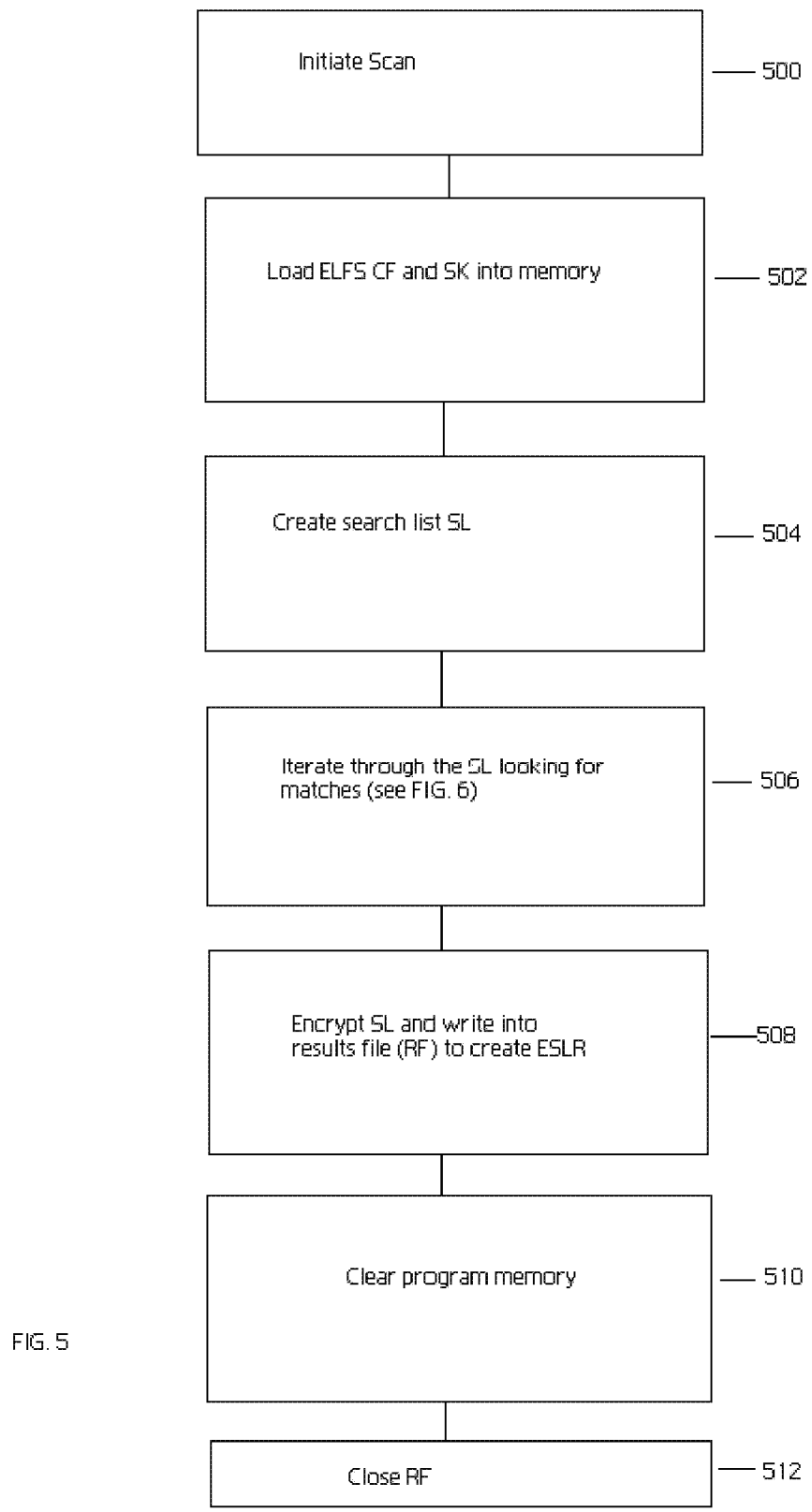
FIG. 5 is a process flow diagram illustrating a scan routine of the scanning mechanism.
Figure 6:
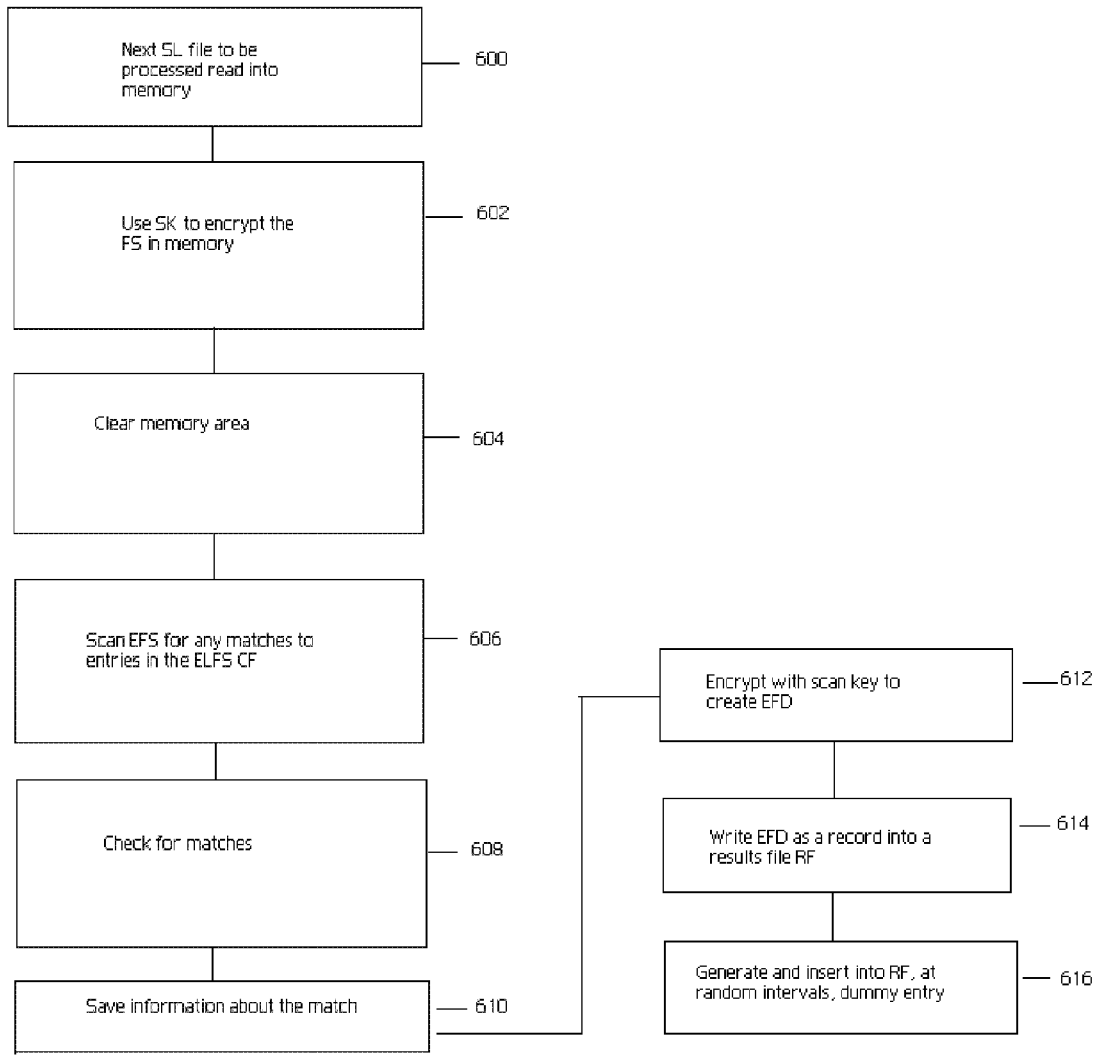
FIG. 6 is a process flow diagram illustrating a matching sub-routine of the scan routine.

FIG. 5 illustrates the scanning process, which is performed by the scanning routine. The routine begins at step 500 with the administrator initiating a "scan" program. Alternatively, this operation is initiated programmatically. At step 502, the scan program loads the ELFS CF into memory, together with the scan key. The scan key is supplied in a secure manner. The scan program performs a search of the data store (or, more generally, the computer system it is running on or for which it has access). Based on this search, the scan program creates a list of files, referred to as a search list (SL). The search list comprises one or more files. This is step 504. The scan process then proceeds through the SL looking for matches. This is step 506. FIG. 6 is a process flow illustrating the matching sub-process in more detail.

The matching sub-process executes for each file in the SL. At step 600, the next SL file to be processed is read into memory. At this point, the SL is sometimes referred to as the "file to be searched" (FS). At step 602, the scan key SK is used to encrypt the FS in memory. The result is an "encrypted file to be searched" or (EFS). At step 604, the memory area in which FS was originally loaded is cleared. The sub-process then continues at step 606 to scan the EFS for any matches to entries in the ELFS container file (ELFS CF). The matching process may be quite varied, such as simple data string matching, or more sophisticated, such as statistical sampling. A test at step 608 is performed to determine if there is a match. If not, the routine cycles, using the next FS in the search list SL. If a match is found, however, the sub-process continues at step 610 to save information about the match. This information includes, without limitation, one or more of: "file name" (File Name), location, an ELFS CF entry identifier, and perhaps other metadata (such as scan time, an offset, a random number, an identifier associated with the scan, or the like). At step 612, the information saved from the match is encrypted with the scan key (SK). The result is the "encrypted data found" (EFD) data item. At step 614, the EFD is written as a record into the "results file" (RF) 316 of FIG. 3.

As the sub-process iterates through the SL, the RF is expanded to include additional EFD data items. At the scan program iterates through the SL, at random or periodic intervals it creates a dummy EFD (DEFD), which is a dummy entry is written as a record into the results file (RF). This is step 616. Thus, preferably the RF will comprise one or more EFD data items, and one or more DEFDs, with the DEFD data items randomly positioned within the RF to look like legitimate entries in that file. The writing of dummy encrypted data, preferably at random intervals, disguises any increase in program activity due to a match being found. A DEFD can be detected when it is unencrypted by being associated with an appropriate location value, e.g., "DUMMY." Once all files to be searched (FSs) in the search list (SL) have been processed in this manner, the sub-process terminates, and controls returns to the process flow in FIG. 5.

Referring now back to FIG. 5, at step 508 the SL is encrypted and written into the results file (RF). This creates an "encrypted SL record" or (ESLR). The routine then clears all program memory (at step 510) and closes the RF (at step 512). This completes the scanning phase.

Figure 7:
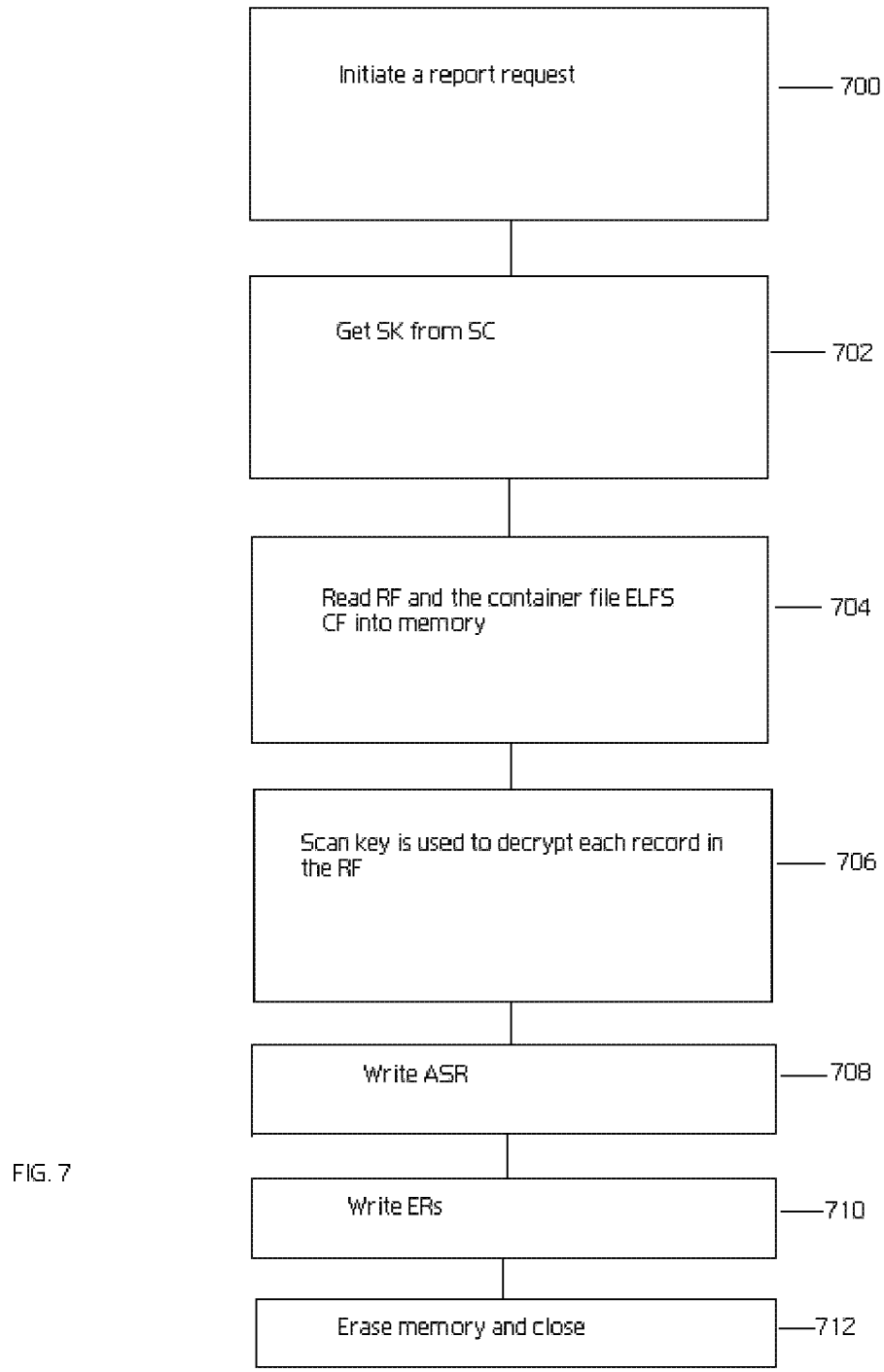
FIG. 7 is a process flow diagram illustrating a report routine.

The final phase is the report process, which is described with reference to FIG. 7 and is implemented using the reporting routine. The process begins at step 700 when the administrator (or some other person or programmatic entity) initiates a report request. At step 702, the scan key SK is fetched from the scan certificate SC. This key is obtained in a secure manner. At step 704, both the results file RF and the container file ELFS CF are read into memory. At step 706, the scan key SK is used to decrypt (in-memory) each record in the results file. As described above, these records are the EFDs, DEFDs, and the single ESLR, that were generated by the scanning routine. Information from the now decrypted ESLR is then written to an "audit scan report" or (ASR). This is step 708. A record in the ASR is sometimes referred to as a prolog record (PR). A PR shows where and what files were scanned by the scan program and what coverage was undertaken by the particular ASR. During step 708, one or more unencrypted DEFD will have been detected (by virtue of having the location value (e.g., "DUMMY")); these elements, however, are not reported on (i.e. they are ignored).

Preferably, for each EFD, the report process writes a report record detailing wherein the match occurred (e.g., by location and filename). In particular, the report process uses a field that is the "entry value in the ELFS CF" to locate the ELFS within the ELFS CF in memory. It then uses the SK to decrypt the ELFS back to the LFS. This permits access to the original filename and location appended to the LFS. This data is added to the report record for this particular EFD, and such report records are termed "match records" (each being an MR). An MR shows each match found, identifying both file names and locations. The administrator (or some other programmatic entity) can then determine whether this is a valid circumstance or a possible security breach. After all records from the RF are processed, the report process writes "epilogue records" (ER). This is step 710. The ERs show the number of matches founds and the date of the ASR. Prior to closing at 712, the report process erases all program memory. This completes the report process.

While the above describes one implementation, one of ordinary skill will appreciate that many variants are also within the scope of this disclosure. Thus, for example, it is not required that the same scan key SK be used throughout the process. One or more different scan keys may be used, and each SF may have associated therewith its own unique SK, and this unique SK will then need to be used throughout the process with respect to that SF. Another variant would be creating multiple container files (the ELFS CF), with each container file being associated with a different key or with different security levels. Yet another variant would be producing multiple audit scan reports (ASRs) to segment the report output if, for example, a destination does not have authority to see an entire report; in such case, metadata in the form of a security level indicator is used to determine which ASR (or portion thereof) will be output from the scan. While in the preferred embodiment each scan comprises a set of files, the described scan and reporting process may be implemented with any number of files including, without limitation, just a single secure file or data object.

The described mechanism has many advantages. By using the scan key (or multiple scan keys) throughout the process in the manner described, the approach does not expose where the entries in the ELFS CF were obtained. Thus, one cannot use the scanning results to determine where to look for or find the originally secured data. Thus, an administrator can use the tool to check systems for the presence of secure data that may have been inadvertently or maliciously copied elsewhere without having the scanning process itself expose the secure data or its supposed location. Further, by incorporating dummy results throughout the scan, it is impossible to determine when matches occur.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, an interface comprising a set of display panels or screens is provided to enable an administrator to configure scans and display the scan results. A command line or other programmatic interface may be used for this purpose. The mechanism and the associated interface are implemented as a "scanning machine" in a special purpose computer, preferably in software executed by one or more processors. The software is maintained in one or more data stores or memories associated with the one or more processors, and the software may be implemented as one or more computer programs. Collectively, this special-purpose hardware and software comprises a secure data scanning mechanism. The scanning mechanism also may be implemented as an adjunct or extension to an existing access manager, policy manager, or other auditing solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The disclosed subject matter can take the form of an entirely hardware embodiment, an entirely software embodiment or an embodiment containing both hardware and software elements. In a preferred embodiment, the invention is implemented in software, which includes but is not limited to firmware, resident software, microcode, etc.

The disclosed subject matter can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium is tangible, and it can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the disclosed subject matter has been presented for purposes of illustration and description, and is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as are suited to the particular use contemplated.

The references herein concerning "files" should not be taken as limiting, as the techniques herein are applicable to any "data item," irrespective of type, format or characteristic.

The type of cryptographic techniques that may be used in conjunction with the above-described scanning scheme may be quite varied. Preferably, and as noted above, the key used to secure or create the ELFS, the EFD, the DEFD and the ESLR are the same symmetric key, but this is not a requirement. It may be desired to use different keys throughout the process, at some decrease in computational efficiency. If desired, each ELFS in the ELFS CF may have associated therewith a different key, and these keys may be unrelated to one another, or they may be related to one another using a cryptographic scheme. The scanning scheme also may be dependent on what cryptographic algorithms are permitted by the entity; for example, the entity may only permit keys that are produced by cryptographic algorithms that are compliant with some corporate or government standard (e.g., FIPS 140-2), in which case the described technique will utilize such keys to ensure a compliant implementation.

Having described my invention, what I now claim is as follows.

The invention claimed is:

1. A method of scanning secure data, comprising:
    for each file of a list of files, comparing for a match an encrypted version of the file against a set of data strings, each of the data strings having been generated by applying a key to a sample of a secure file and associated metadata;
    encrypting into a results file information about any match; and
    inserting at random intervals into the results file an encrypted version of a dummy data item to disguise when matches have occurred;
    wherein at least one of the comparing, encrypting and inserting operations is carried out by software executing in a hardware element.

2. The method as described in claim 1 wherein the key is used to encrypt the information about any match into the results file.

3. The method as described in claim 1 wherein the key is used to generate the encrypted version of the dummy data item.

4. The method as described in claim 1 wherein the set of data strings includes first and second data strings, the first data string being generated by applying a first key to a first secure file and its associated metadata, and the second data string being generated by applying a second key to a second secure file and its associated metadata, wherein the first key differs from the second key.

5. An apparatus for scanning secure data in a data store, comprising:
    a processor; and
    computer memory holding computer instructions that, when executed by the processor, perform a method comprising:
        for each file of a list of files, comparing for a match an encrypted version of the file against a set of data strings, each of the data strings having been generated by applying a key to a sample of a secure file and associated metadata;
        encrypting into a results file information about any match; and
        inserting at random intervals into the results file an encrypted version of a dummy data item to disguise when matches have occurred.

6. The apparatus as described in claim 5 wherein the key is used to encrypt the information about any match into the results file.

7. The apparatus as described in claim 5 wherein the key is used to generate the encrypted version of the dummy data item.

8. The apparatus as described in claim 5 wherein the set of data strings includes first and second data strings, the first data string being generated by applying a first key to a first secure file and its associated metadata, and the second data string being generated by applying a second key to a second secure file and its associated metadata, wherein the first key differs from the second key.

9. An article comprising a non-transitory machine readable medium that stores a program, the program being executed by a machine to perform a method of scanning secure data, the method comprising:
    for each file of a list of files, comparing for a match an encrypted version of the file against a set of data strings, each of the data strings having been generated by applying a key to a sample of a secure file and associated metadata;
    encrypting into a results file information about any match; and
    inserting at random intervals into the results file an encrypted version of a dummy data item to disguise when matches have occurred.

10. The article as described in claim 9 wherein the key is used to encrypt the information about any match into the results file.

11. The article as described in claim 9 wherein the key is used to generate the encrypted version of the dummy data item.

12. The article as described in claim 9 wherein the set of data strings includes first and second data strings, the first data string being generated by applying a first key to a first secure file and its associated metadata, and the second data string being generated by applying a second key to a second secure file and its associated metadata, wherein the first key differs from the second key.

* * * * *